(12) United States Patent
Wu

(10) Patent No.: US 11,219,014 B2
(45) Date of Patent: Jan. 4, 2022

(54) TRANSMITTING USER EQUIPMENT CAPABILITIES

(71) Applicant: Google LLC, Mountain View, CA (US)

(72) Inventor: Chih-Hsiang Wu, Taoyuan (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/569,061

(22) Filed: Sep. 12, 2019

(65) Prior Publication Data

US 2020/0092879 A1 Mar. 19, 2020

Related U.S. Application Data

(60) Provisional application No. 62/731,716, filed on Sep. 14, 2018.

(51) Int. Cl.
| | | |
|---|---|---|
| *H04W 72/04* | (2009.01) | |
| *H04W 76/15* | (2018.01) | |
| *H04W 8/00* | (2009.01) | |
| *H04W 8/24* | (2009.01) | |

(52) U.S. Cl.
CPC ....... *H04W 72/0426* (2013.01); *H04W 8/005* (2013.01); *H04W 8/24* (2013.01); *H04W 76/15* (2018.02)

(58) Field of Classification Search
CPC ............. H04W 72/0426; H04W 76/15; H04W 8/005; H04W 8/24; H04W 52/0235
USPC ........................................................ 455/450
See application file for complete search history.

(56) References Cited

U.S. PATENT DOCUMENTS

| | | |
|---|---|---|
| 8,818,366 B2 | 8/2014 | Wang |
| 2018/0227737 A1 | 8/2018 | Wu |
| 2018/0227960 A1 | 8/2018 | Belghoul et al. |
| 2018/0343697 A1 | 11/2018 | Hsu et al. |
| 2020/0214065 A1* | 7/2020 | Tomala .................. H04W 76/15 |

FOREIGN PATENT DOCUMENTS

| | | |
|---|---|---|
| CN | 103427937 | 12/2016 |
| EP | 2942996 | 11/2015 |
| WO | 2016080899 | 5/2016 |

(Continued)

OTHER PUBLICATIONS

"ETSI TS 136 331 V15.2.2", ETSI TS 136 331 V15.2.2 (Sep. 2019); 3GPP TS 36.331 version 15.2.2 Release 15), Sep. 2018.

(Continued)

*Primary Examiner* — Phuoc H Doan
(74) *Attorney, Agent, or Firm* — Colby Nipper PLLC

(57) ABSTRACT

In some aspects, an evolved universal terrestrial radio access base station generates a capability enquiry message for requesting radio access capabilities of a user equipment. At times, the evolved universal terrestrial radio access base station configures a capability enquiry information element included in the capability enquiry message to request eutra-nr-only radio access capabilities of the user equipment. The evolved universal terrestrial radio access base station then transmits the capability enquiry message to the user equipment. Afterwards, the evolved universal terrestrial radio access base station receives, from the user equipment, a capability information message that includes at least some radio access capabilities for new radio that are supported by the user equipment.

19 Claims, 12 Drawing Sheets

(56) References Cited

FOREIGN PATENT DOCUMENTS

WO        2017185199      11/2017
WO        2020056278       3/2020

OTHER PUBLICATIONS

"Written Opinion", Application No. PCT/US2019/051039, dated Jul. 29, 2020, 6 pages.
"Inclusion of NR Capability by EN-DC UE", 3GPP TSG-RAN WG2 #103 meeting, Gothenburg, Sweden, Aug. 20-24, 2018, Aug. 2018, 4 pages.
"International Search Report and Written Opinion", PCT Application No. PCT/US2019/051039, Nov. 13, 2019, 16 pages.
"Introduction of SA", 3GPP TSG-WG2 Meeting #103, Gothenburg, Sweden, Aug. 20-24, 2018, Aug. 2018, 432 pages.
"Miscellaneous EN-DC Related Corrections", 3GPP TSG-WG2 meeting #103, Gothenburg, Sweden, Aug. 20-24, 2018, Aug. 2018, 102 pages.
"ETSI TS 136 331 V15.2.2", ETSI TS 136 331 V15.2.2 (Sep. 2018) 3GPP TS 36.331 version 15.2.2 Release 15), Sep. 2018.
"Foreign Office Action", Taiwanese Application No. 108133095, May 29, 2020, 12 pages.
"International Preliminary Report on Patentability", PCT Application No. PCT/US2019/051039, dated Nov. 19, 2020, 8 pages.
"Relation of Feature Sets and Band Combinations", 3GPP TSG-RAN WG2 #103bis, Tdoc R2-1814979, Chengdu, China, Oct. 8, 2018 to Oct. 12, 2018, Oct. 2018, 6 pages.

* cited by examiner

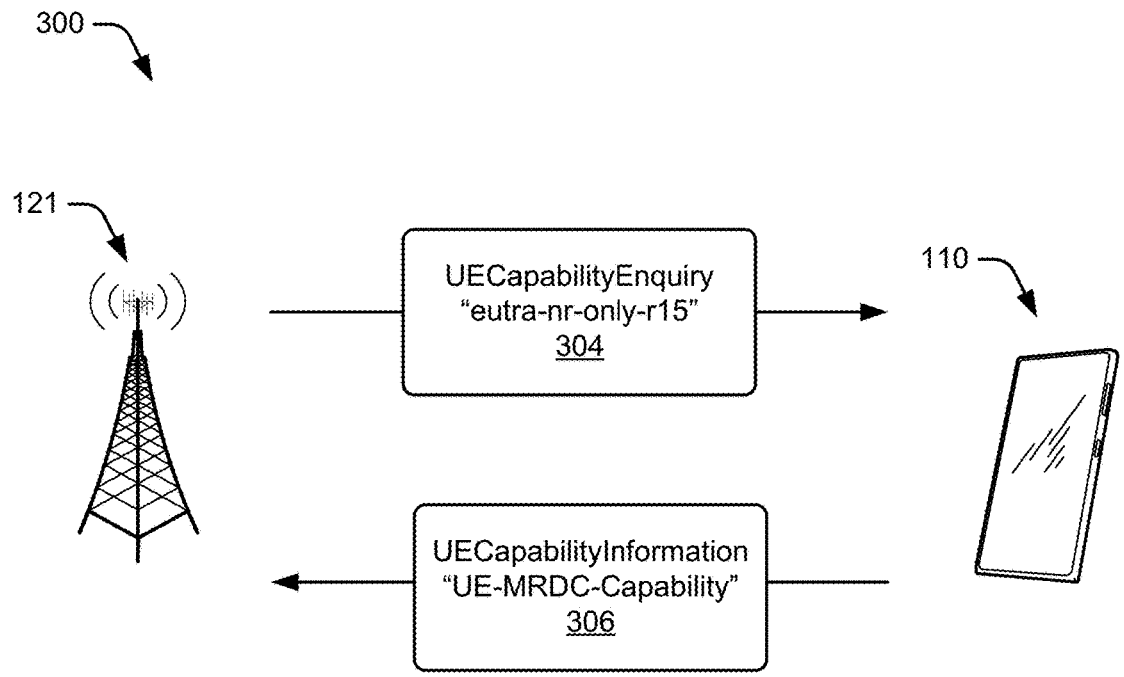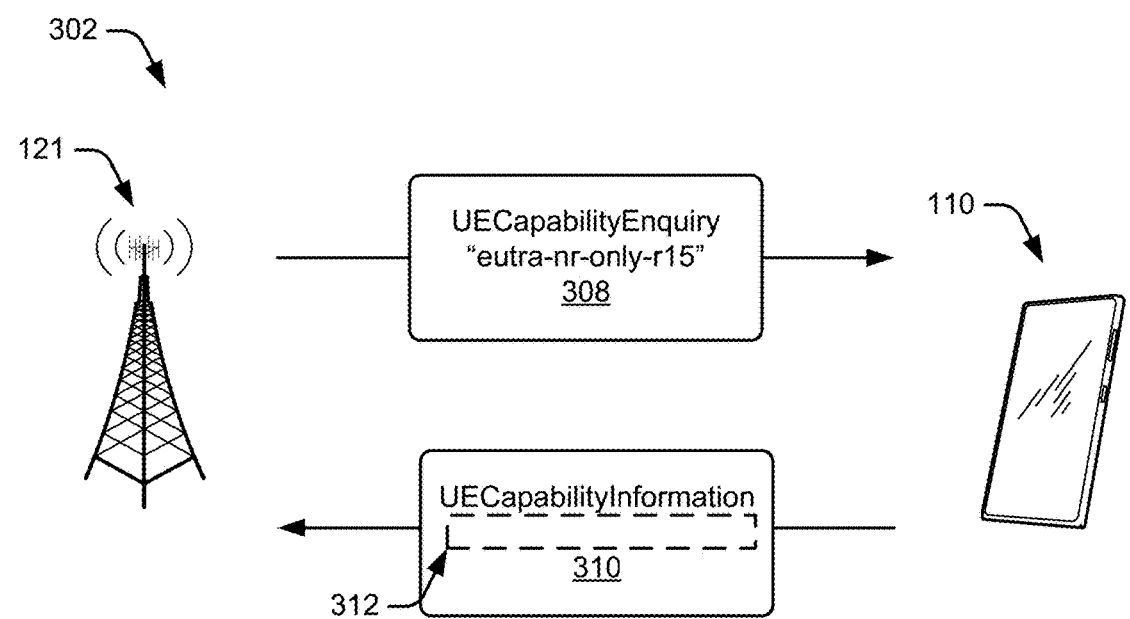
FIG. 3

500

```
UE-NR-Capability :: = SEQUENCE {
    accessStatumRelease         AccessStratumRelease,
    Pdcp-Parameters             PDCP-Parameters,
    Rlc-Parameters              RLC-Parameters        OPTIONAL,
        . . .
```

502

```
    featureSetCombinations  SEQUENCE (SIZE ( 1..maxFeatureSetCombiantions) )
                            OF FeatureSetCombination  OPTIONAL,
```

```
    lateNonCriticalExtension    OCTET    STRING       OPTIONAL,
    nonCriticalExtension        UE-NR-Capability-vxy  OPTIONAL
}
```

FIG. 5

TRANSMITTING USER EQUIPMENT CAPABILITIES

RELATED APPLICATION

This application claims priority to U.S. Provisional Patent Application Ser. No. 62/731,716 filed Sep. 14, 2018, the disclosure of which is incorporated by reference herein in its entirety.

BACKGROUND

The evolution of wireless communication to fifth generation (5G) standards and technologies provides higher data rates and greater capacity, with improved reliability and lower latency that enhances mobile broadband services. 5G technologies also provide new classes of services for vehicular networking, fixed wireless broadband, and the Internet of Things (IoT).

To support the transition to 5G networks, multiple radio access technology connectivity enables a user equipment (UE) to simultaneously connect to Evolved Universal Terrestrial Radio Access (E-UTRA) and 5G NR base stations. As part of enabling this dual connectivity, an E-UTRA base station determines the dual-connectivity capabilities of a UE. Without such an understanding, the E-UTRA base station may fail to support dual connectivity, thereby causing the UE to forgo the many benefits of 5G communications.

SUMMARY

This summary is provided to introduce simplified concepts for transmitting user equipment capabilities. The simplified concepts are further described below in the Detailed Description. This summary is not intended to identify essential features of the claimed subject matter nor is it intended for use in determining the scope of the claimed subject matter.

In some aspects, an evolved universal terrestrial radio access base station generates a capability enquiry message for requesting radio access capabilities of a user equipment. At times, the evolved universal terrestrial radio access base station configures a capability enquiry information element included in the capability enquiry message to request eutra-nr-only radio access capabilities of the user equipment. The evolved universal terrestrial radio access base station then transmits the capability enquiry message to the user equipment. Afterwards, the evolved universal terrestrial radio access base station receives, from the user equipment, a capability information message that includes at least some radio access capabilities for new radio that are supported by the user equipment.

In some aspects, a user equipment receives, from an evolved universal terrestrial radio access base station, a capability enquiry message that requests radio access capabilities supported by the user equipment. One or more implementations of the capability enquiry message include a capability enquiry information element that requests eutra-nr-only radio access capabilities from the user equipment. The user equipment generates, in response to the user equipment supporting new radio and the capability enquiry information element requesting eutra-nr-only radio access capabilities, a capability information message that includes at least some radio access capabilities for new radio that are supported by the user equipment. Afterwards, the user equipment transmits the capability information message to the evolved universal terrestrial radio access base station.

In some aspects, a method is described for communicating user equipment capabilities by a user equipment (UE) in a cellular network. The method receives, from an Evolved Universal Terrestrial Radio Access (E-UTRA) base station, a request for an information element, the request including at least two fields and/or flags associated with a New Radio (NR) capability of the UE, the information element requested to indicate a response to at least one of the two fields and/or flags. The method then continues by transmitting, by the UE, the information element to the E-UTRA base station, the information element including the response to at least one of the two fields and/or flags, the response indicating the UE's NR radio access capability parameters, the transmitting effective to enable the UE and a 5G NR base station to communicate according to the UE's NR radio access capability parameters while the UE is connected to the E-UTRA base station.

In other aspects, a method is described for communicating user equipment capabilities by an Evolved Universal Terrestrial Radio Access (E-UTRA) base station of a cellular network. The method includes transmitting, from the E-UTRA base station and to a user equipment (UE), a request for an information element, the request including two fields and/or flags associated with a New Radio (NR) capability of the UE, the request for a response to at least one of the two fields and/or flags. The method may then receive, by the E-UTRA base station, the information element from the UE, the information element including the response to at least one of the two fields and/or flags, the response indicating the UE's NR radio access capability parameters, the transmitting effective to enable the UE and a 5G NR base station to communicate according to the UE's NR radio access capability parameters while the UE is connected to the E-UTRA base station.

BRIEF DESCRIPTION OF THE DRAWINGS

Aspects of transmitting user equipment capabilities are described with reference to the following drawings. The same numbers are used throughout the drawings to reference like features and components:

FIG. 3 illustrates example environments in which an E-UTRA base station and a UE exchange information that is used in implementations of transmitting UE capability information.

FIG. 5 illustrates an example information element that can be used for transmitting UE capability information in accordance with one or more implementations.

DETAILED DESCRIPTION

Overview

Figure 1:
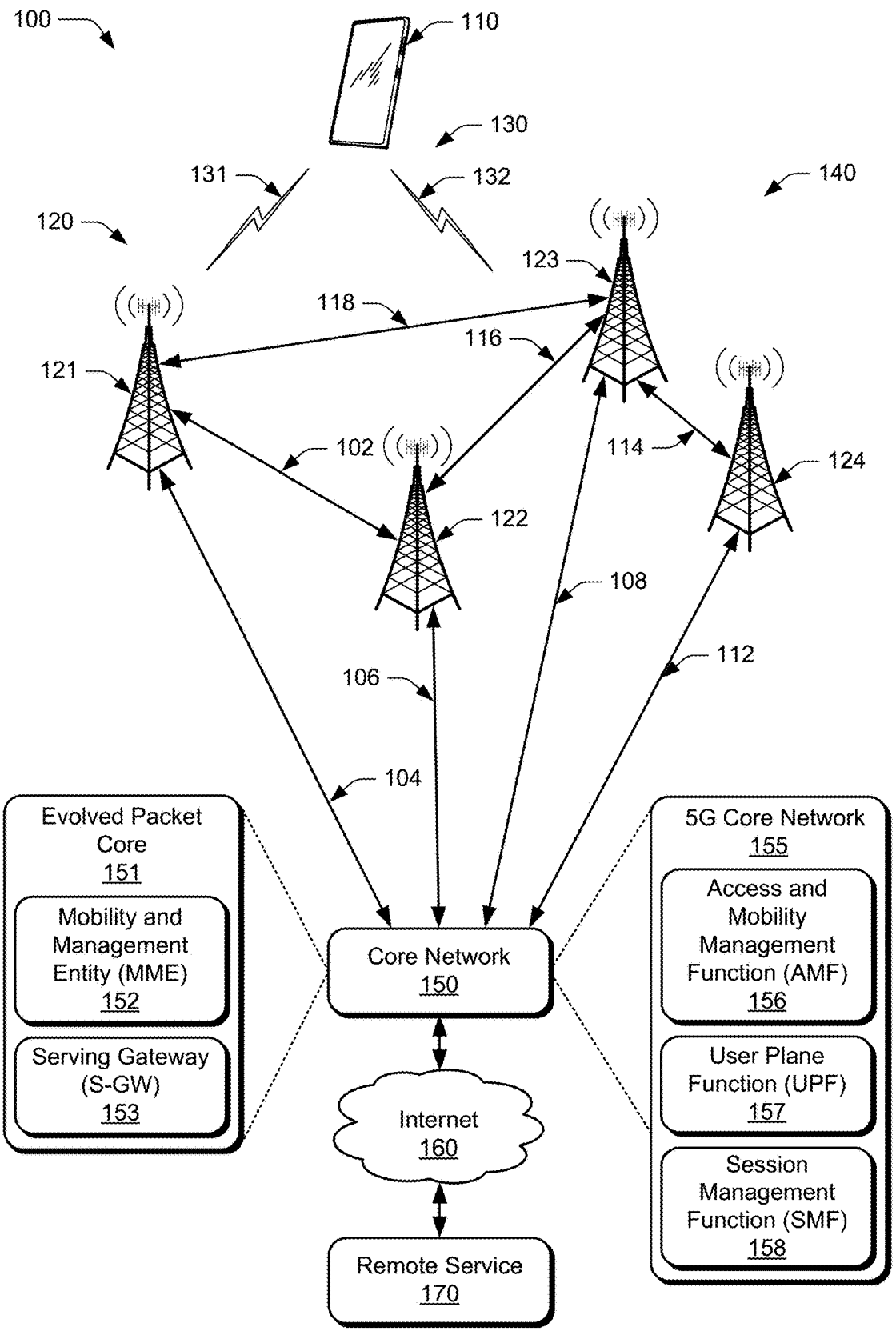
FIG. 1 illustrates an example wireless network environment in which various aspects of transmitting user equipment capabilities can be implemented.

This document describes techniques and devices for transmitting user equipment (UE) capabilities. As part of establishing dual connectivity, an Evolved Universal Terrestrial Radio Access (E-UTRA) base station (e.g., eNB or ng-eNB) requires capability information for the UE. This capability information, often received in the form of an information element (IE), may include a UE-MRDC-Capability IE and a UE-NR-Capability IE from the UE. Current techniques, however, fail to efficiently enable a base station to request, from the UE, information about the UE's fifth generation (5G) new radio (NR) capability (e.g., the UE-NR-Capability IE). To address this inefficiency, a new field can be added to the protocol by which the base station can request a UE's NR radio access capability parameters (e.g., the UE-NR-Capability IE), which include NR radio access capabilities for operation of EUTRA-NR dual connectivity. However, this new field, which is proposed as "EUTRA-NR-ONLY-R15", will not be understood by UEs that are using older protocols, such as those set forth in 3GPP TS 36.311 v15.2.2. Therefore, the proposed new field will not enable an E-UTRA base station to receive the UE's capabilities from older-protocol UEs.

To address this problem, this document describes techniques and devices for transmitting UE capabilities. These techniques include requesting, as part of a capability enquiry, information about the UE's capability in different ways. For example, the techniques may request, through a UECapabilityEnquiry message, a response that includes UE capability information, where the response is generated based on fields that request radio access capability parameters. In implementations, the request includes two or more fields, such as a first "nr" field that requests radio access capabilities for new radio, and a second "eutra-nr-only-r15" flag that requests radio access capabilities for dual connectivity only. In some scenarios, a first version of protocol, such as 3GPP TS 36.311 v15.2.2, supports the first field, while a second version of protocol, such as 3GPP TS 36.311 v15.3.0 or later that includes additional features relative to the first protocol, supports the second field. By including the multiple fields, a UE that does not understand the second field (e.g., a "eutra-nr-only-r15" flag supported by the second protocol) will potentially understand the first field (e.g., the "nr" field supported by the first protocol), thereby permitting the UE to indicate NR radio access capabilities (e.g., in a UE-NR-Capability IE) for both EN-DC (dual connectivity) and "NR standalone mode" if the UE supports both. Furthermore, sending a request with both fields can be handled by UEs that understand the new field. To illustrate, a UE that understands both fields sometimes sends a UE-NR-Capability IE that includes "EN-DC only" capabilities, instead of EN-DC capabilities and "NR standalone mode capabilities" supported by the UE, based on the UE understanding the second field.

In some aspects, an evolved universal terrestrial radio access base station generates a capability enquiry message for requesting radio access capabilities of a user equipment. At times, the evolved universal terrestrial radio access base station configures a capability enquiry information element included in the capability enquiry message to request eutra-nr-only radio access capabilities of the user equipment. The evolved universal terrestrial radio access base station then transmits the capability enquiry message to the user equipment. Afterwards, the evolved universal terrestrial radio access base station receives, from the user equipment, a capability information message that includes at least some radio access capabilities for new radio that are supported by the user equipment.

In some aspects, a user equipment receives, from an evolved universal terrestrial radio access base station, a capability enquiry message that requests radio access capabilities supported by the user equipment. One or more implementations of the capability enquiry message include a capability enquiry information element that requests eutra-nr-only radio access capabilities from the user equipment. The user equipment generates, in response to the user equipment supporting new radio and the capability enquiry information element requesting eutra-nr-only radio access capabilities, a capability information message that includes at least some radio access capabilities for new radio that are supported by the user equipment. Afterwards, the user equipment transmits the capability information message to the evolved universal terrestrial radio access base station.

While features and concepts of the described systems and methods for transmitting user equipment capabilities can be implemented in any number of different environments, systems, devices, and/or various configurations, aspects of transmitting user equipment capabilities are described in the context of the following example devices, systems, and configurations.

Example Environment

FIG. 1 illustrates an example environment 100, which includes a user equipment 110 (UE 110) that can communicate with one or more base stations 120 (illustrated as base stations 121, 122, 123, and 124) through one or more wireless communication links 130 (wireless link 130), illustrated as wireless links 131 and 132. In this example, the user equipment 110 is implemented as a smartphone. Although illustrated as a smartphone, the user equipment 110 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base stations 120 (e.g., an Evolved Universal Terrestrial Radio Access Network Node B, E-UTRAN Node B, evolved Node B, eNodeB, eNB, Next Generation eNode B, gNode B, gNB, or the like) may be implemented in a macrocell, microcell, small cell, picocell, and the like, or any combination thereof.

The base stations 120 communicate with the UE 110 via the wireless links 131 and 132, which may be implemented as any suitable type of wireless link. The wireless links 131 and 132 can include a downlink of data and control information communicated from the base stations 120 to the UE 110, an uplink of other data and control information communicated from the UE 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110, as well as dual connectivity, such as single-RAT LTE-LTE or NR-NR dual connectivity or Multi-Radio Access Technology (Multi-RAT) Dual Connectivity (MR-DC) including EN-DC, NGEN-DC, and NE-DC.

The base stations 120 are collectively a Radio Access Network 140 (RAN, Evolved Universal Terrestrial Radio Access Network, E-UTRAN, 5G NR RAN or NR RAN). The base stations 121, 122, 123, and 124 are connected to a core network 150 via control-plane and user-plane interfaces at links 104, 106, 108, and 112, respectively. In EN-DC, the core network 150 is an Evolved Packet Core 151 (EPC 151) that includes a Mobility Management Entity 152 (MME 152) that provides control-plane functions such as registration and authentication of multiple UE 110, authorization, mobility management, or the like. The EPC 151 includes a Serving Gateway 153 (S-GW 153) that relays user-plane data between UEs 110 and the Internet 160 and a remote service 170. In NGEN-DC and NE-DC, the core network 150 is a 5G core network 155 (5GC 155) that includes an Access and Mobility Management Function 156 (AMF 156) that provides control-plane functions such as registration and authentication of multiple UE 110, authorization, mobility management, or the like. The 5GC 155 includes a Session Management Function (SMF) 158 that provides control-plane functions such as managing sessions of multiple UE 110. The 5GC 155 includes a User Plane Function 157 (UPF 157) that relays user-plane data between UEs 110 and the Internet 160 and the remote service 170.

When both base stations 121, 122 are E-UTRA base stations, the base stations 121, 122 can communicate user-plane and control-plane data via an X2 interface over the link 102, and via links 104, 106 to an EPC 151. Alternatively, when both base stations 121, 122 are 5G NR base stations, base stations 121, 122 can communicate user-plane and control-plane data via an Xn interface over the link 102, and via links 104, 106 to a 5G core network 155. When base station 121 is an E-UTRA base station and base station 122 is a 5G NR base station, the base stations 121, 122 can communicate user-plane and control-plane data via the Xn interface over the link 102, and via links 104, 106 to the 5G core network 155. When base station 121 is the E-UTRA base station and base station 122 is a 5G NR base station, the base stations 121, 122 can communicate user-plane and control-plane data via an X2 interface over the link 102, the base station 121 can communicate user-plane and control-plane data via link 104 to the EPC 151 and the base station 122 can communicate user-plane data via link 106 to the EPC 151. When base station 121 is the E-UTRA base station and base station 122 is the 5G NR base station, the base stations 121, 122 can communicate user-plane and control-plane data via the Xn interface over the link 102, the base station 121 can communicate user-plane and control-plane data via link 104 to the 5GC 155 and the base station 122 can communicate user-plane data via link 106 to the 5GC 155. Furthermore, the base stations 123 and 124 communicate via an X2 interface at 114, and the base station 122 may communicate with the base station 123 also via an Xn interface, shown at 116.

Figure 2:
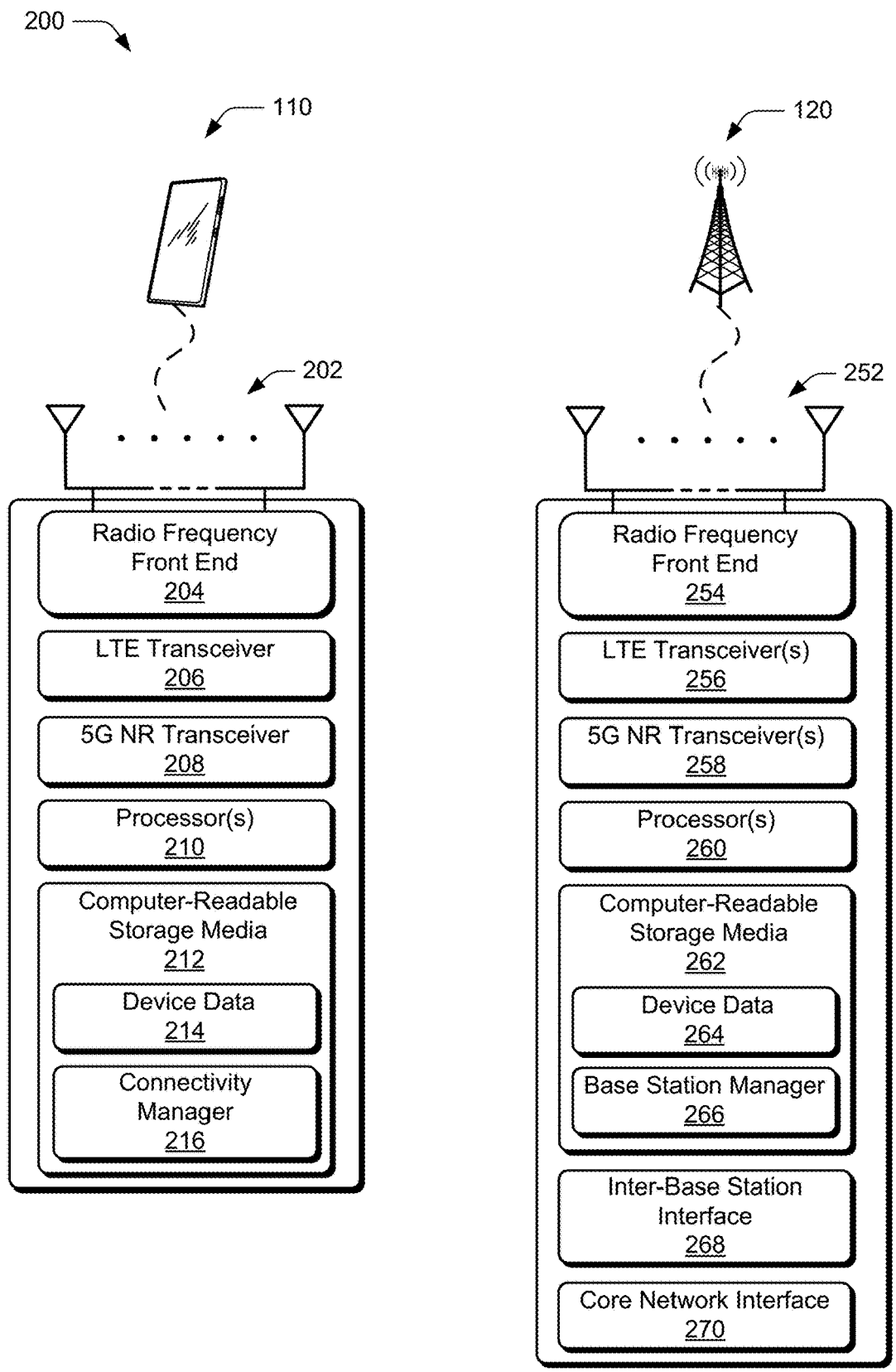
FIG. 2 illustrates an example device diagram that can implement various aspects of transmitting user equipment capabilities.

FIG. 2 illustrates an example device diagram 200 of the user equipment 110, the base station 121, and the neighbor base station 122. The user equipment 110, the base station 121, and the neighbor base station 122 may include additional functions and interfaces that are omitted from FIG. 2 for the sake of clarity. The user equipment 110 includes antennas 202, a radio frequency front end 204 (RF front end 204), an LTE transceiver 206, and a 5G NR transceiver 208 for communicating with base stations 120. The RF front end 204 of the user equipment 110 can couple or connect the LTE transceiver 206, and the 5G NR transceiver 208 to the antennas 202 to facilitate various types of wireless communication. The LTE transceiver 206 and the 5G NR transceiver 208 may include sensor circuitry and algorithms for measuring characteristics of radio signals and/or sensing in-device coexistence issues. The antennas 202 of the user equipment 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base station 121, the base station 122, or both. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The user equipment 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the user equipment 110. The device data 214 includes user data, multimedia data, beamforming codebooks, applications, and/or an operating system of the user equipment 110, which are executable by processor(s) 210 to enable user-plane communication, control-plane signaling, and user interaction with the user equipment 110.

CRM 212 also includes a connectivity manager 216. Alternately or additionally, the connectivity manager 216 may be implemented in whole or part as hardware logic or circuitry integrated with or separate from other components of the user equipment 110. In at least some aspects, the connectivity manager 216 configures the RF front end 204, the LTE transceiver 206, and/or the 5G NR transceiver 208 to implement the techniques for transmitting user equipment capabilities described herein.

The device diagram for the base stations 120, shown in FIG. 2, includes a representative single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266. Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120 per FIG. 1 link 102 or 116, to manage the communication of the base stations 120 with the UE 110. The base stations 120 include a core network interface 270, such as an S1 or NG interface, which the base station manager 266 configures to exchange user-plane and control-plane data with core network functions and entities per FIG. 1 links 104, 106, 108, or 112.

Having described an example environment and example devices that can be utilized for transmitting user equipment capabilities, consider now a discussion of acquiring dual connectivity user equipment capabilities that is in accordance with one or more implementations.

Acquiring Dual Connectivity User Equipment Capabilities

As wireless communications evolve, so too does the exchange of information between devices. For example, 5G supports dual connectivity of a user equipment to E-UTRA and 5G NR base stations. To establish the dual connectivity, some implementations of an E-UTRA base station communicate with a UE to request and obtain radio access capability information, such as by requesting and receiving a UE-MRDC-Capability IE that includes user equipment capabilities that pertain to EN-DC, and/or requesting and receiving a UE-NR-Capability IE that provides user equipment capabilities pertaining to NR. Even though some protocol versions include mechanisms to request and receive dual connectivity user equipment capabilities, these mechanisms may not be identified and/or supported by UE's implementing older protocol versions. To demonstrate, consider FIG. 3 that illustrates a first example environment 300 and a second example environment 302 in which an E-UTRA base station and a UE exchange information that is used in implementations of transmitting UE capability information.

In example environment 300, the E-UTRA base station 121 transmits a UECapabilityEnquiry message 304 to the UE 110, where the UECapabilityEnquiry message includes a "eutra-nr-only-r15" flag as further described. In implementations, devices that support newer protocols, such as 3GPP TS 36.311 v15.3.0 or later, identify this field. Conversely, devices that support older protocols, such as 3GPP TS 36.311 v15.2.2, and do not include support for the newer protocols, are unable to recognize this field.

In the environment 300, the UE 110 supports a newer protocol (e.g., 3GPP TS 36.311 v15.3.0 or later), supports EN-DC, and recognizes the inclusion of the "eutra-nr-only-r15" flag. Accordingly, to indicate support for EN-DC, the UE 110 returns a UECapabilityInformation message 306 that includes a "UE-MRDC-Capability" IE. In some implementations, the UE also automatically includes a UE-NR-Capability IE based on identifying the "eutra-nr-only-r15" flag, where the UE excludes "NR only" band combinations and/or "NR standalone mode" capabilities from the UE-NR-Capability IE to reduce an amount of data transferred between devices. In other implementations where the UE identifies the "eutra-nr-only-r15" flag, the UE only includes the UE-NR-Capability IE when directed by the base station (e.g., the base station requests radio access capabilities corresponding to NR), where the UE then excludes the "NR only" band combinations and/or the "NR standalone mode" capabilities based on the inclusion of the "eutra-nr-only-r15" flag.

Moving to the environment 302, the base station 121 transmits a UECapabilityEnquiry message 308 to the UE 110, where the UECapabilityEnquiry message again includes a "eutra-nr-only-r15" flag. However, in the environment 302, the UE 110 does not support newer protocols (e.g., 3GPP TS 36.311 v15.3.0 or later), and instead supports an older protocol (e.g., 3GPP TS 36.311 v15.2.2). Accordingly, the UE 110 does not identify the "eutra-nr-only-r15" flag in the message 308 and fails to include a UE-MRDC-Capability IE in the UECapabilityInformation message 310, emphasized by empty space 312. In other words, the base station 121 fails to receive the UE's radio access capabilities corresponding to dual connectivity since the UE 110 in the environment 302 only supports an older protocol.

Various implementations acquire UE capabilities related to EN-DC from UE's that support older protocols (e.g., 3GPP TS 36.311 v15.2.2) by configuring supported fields in information elements as further described. Alternately or additionally, some implementations provide a mechanism to reduce an amount of information returned by the UE. To demonstrate, consider now FIG. 4 that illustrates an example message 400 that can be used for requesting radio access capabilities corresponding to dual connectivity in accordance with one or more implementations. The message 400 corresponds to example information included in a UECapabilityEnquiry message transmitted by the base station 121 to obtain radio access capabilities of a UE, such as radio access capabilities corresponding to dual connectivity. In various implementations, the base station 121 generates the message 400 using processor 260 of FIG. 2, stores the message 400 in CRM 262 of FIG. 2, and/or communicates the message 400 to the UE 110 over the wireless links 131 of FIG. 1.

The base station 121 configures the message 400 to request radio access capabilities from the UE 110 as further described. For the sake of clarity, the message 400 omits information, and it is to be appreciated that the UECapabilityEnquiry message can include any alternate or additional combinations of information not illustrated here. The message 400 includes a UECapabilityEnquiry-r8-IE 402, where IE 404 denotes an example configuration of information included in the UECapabilityEnquiry-r8-IE 402. In implementations, the base station 121 configures the UECapabilityEnquiry-r8-IE 402 to request radio access capability information from the UE. To illustrate, the base station 121 configures UE-CapabilityRequest 406 and/or elements of UECapabilityEnquiry-v8a0-IEs 408.

Field 410 illustrates an example configuration of information included in the UE-CapabilityRequest 406, where the field 410 includes a sequence of RAT-TYPE elements 412. To request RAT user equipment capabilities, the base station 121 sets the values within the field 410 to any combination and/or number (up to maxRAT-Capabilities) of RAT types. The base station 121, for example, includes "nr" in the field 410 to request radio access capabilities for New Radio, includes "eutra-nr" in the field 410 to request radio access capabilities for EN-DC, includes "eutra" in the field 410 to request radio access capabilities for E-UTRA, etc. In implementations, older protocols, such as 3GPP TS 36.311 v15.2.2, identify the UE-CapabilityRequest 406. Configuring the UE-CapabilityRequest field to include "nr" allows the base station 121 to request radio access capabilities for new radio user from a UE that supports older protocols. Alternately or additionally, configuring the UE-CapabilityRequest field to include "eutra-nr" allows the base station 121 to request dual-connectivity user equipment capability information from UEs that support the old protocols.

The UECapabilityEnquiry-v8a0-IEs 408 provides an alternate implementation for requesting radio access capabilities from a UE. In implementations, the UECapabilityEnquiry-v8a0-IEs 408 includes nested IEs, where the additional IEs include additional fields and/or elements relative to the UECapabilityEnquiryIEs 408 for newer protocols (e.g., protocols that include additional features relative to previous protocols). To demonstrate, consider IE 414 that illustrates an example configuration of information that can be included in the UECapabilityEnquiry-v8a0-IEs 408. For the sake of clarity, the IE 414 omits information, and it is to be appreciated that a UECapabilityEnquiry-v8a0-IEs information element can include any alternate or additional combinations of information not illustrated here.

Figure 4:
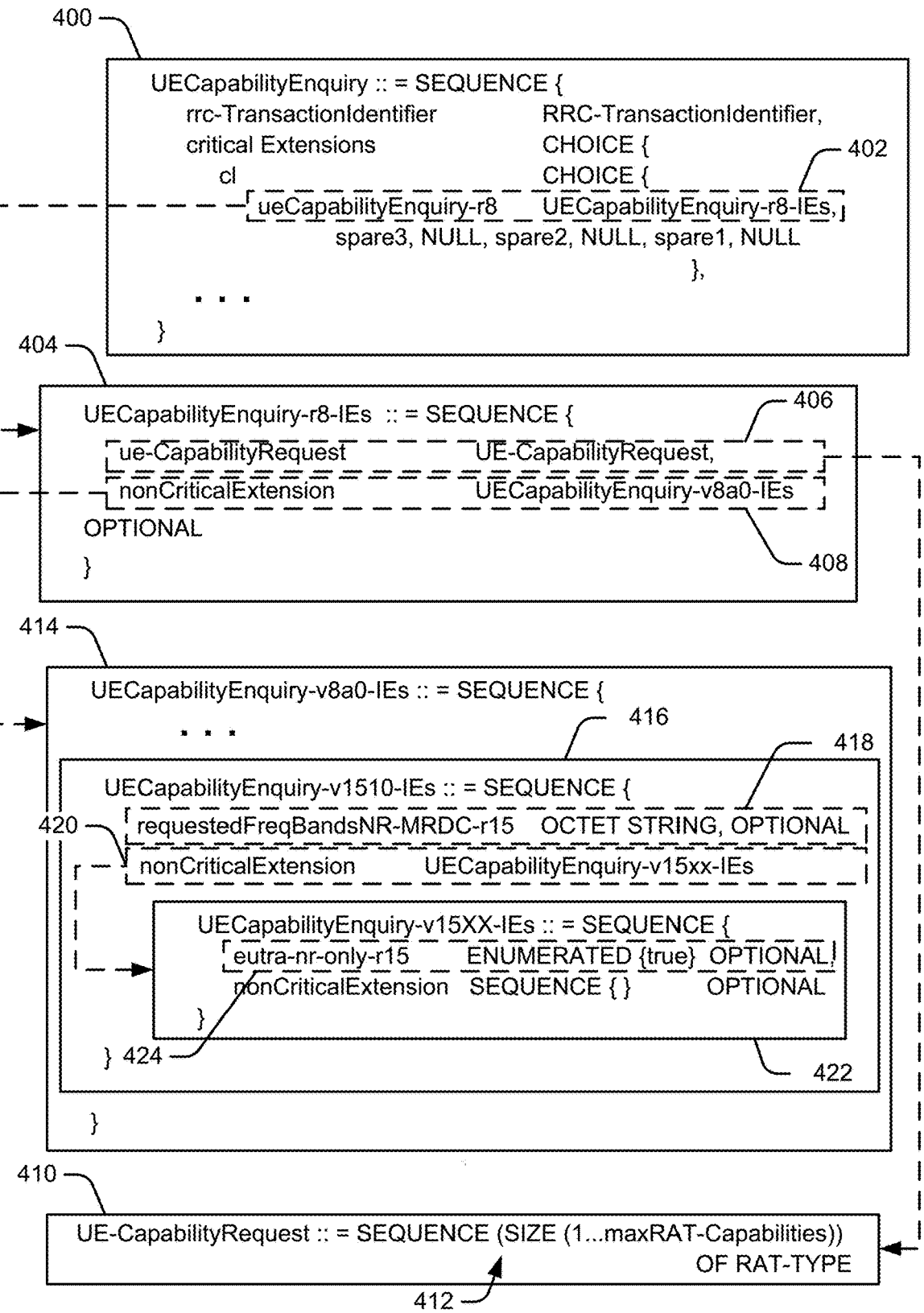
FIG. 4 illustrates an example message that can be used for requesting radio access capabilities corresponding to dual connectivity in accordance with one or more implementations.

In FIG. 4, the IE 414 includes an IE 416 (e.g., UECapabilityEnquiry-v1510-IEs) that includes additional information, fields, and/or elements supported by a newer protocol than that of a protocol associated with IE 414. While FIG. 4 illustrates IE 414 as including IE 416, it is to be appreciated that the IE 414 can include an arbitrary number of nested IE's that request radio access capabilities using mechanisms supported by different protocols. For example, IE 416 includes two fields and/or IEs that request radio access capabilities, where the fields are unsupported by the protocol associated with IE 414: a requestedFreqBandsNR-MRDC-r15 field 418 and a UECapabilityEnquiry-v15xx-IEs field 420.

In implementations, a base station configuring a UECapabilityEnquiry message configures the requested-FreqBandsNR-MRDC-r15 field 418 as a list of NR and/or EUTRA frequency bands. The list indicates, to a receiving UE, a request for supported NR Carrier Aggregation and/or MR-DC band combinations. In other words, the base station provides a list of requested frequency bands in the field 418, and a receiving UE analyzes the list to identify frequency bands, from the list, supported by the UE. Afterwards, the UE responds with one or more supported bands that match the list. Thus, the requestedFreqBandsNR-MRDC-r15 field 418 provides a base station with a mechanism to request specific bands from the UE. In implementations, a UE that identifies the requestedFreqBandsNR-MRDC-r15 field 418 returns supported NR CA and/or MR-DC band combinations using UE capability containers (e.g., a UE-NR-Capability IE, a UE-MRDC-Capability IE).

As another example of a nested information element, the IE 416 includes a UECapabilityEnquiry-v15xx-IEs field 420 that includes additional mechanisms for requesting radio access capability information from UEs. In implementations, these additional mechanisms are supported by a (newer) protocol version associated with the field 420. To demonstrate, consider IE 422 that illustrates an example configuration of information that can be included in the UECapabilityEnquiry-v15xx-IEs field 420, but it is to be appreciated that the IE 422 can include any alternate or additional combinations of information not illustrated here.

In FIG. 4, the IE 422 includes an optional flag 424 (e.g., "eutra-nr-only-r15") that, when included in the IE 422, requests radio access capability information pertaining to EN-DC. The base station 121, for example, includes the optional flag 424 to request EN-DC radio access capability information from the UE 110. This inclusion directs a UE that supports the newer protocol, and subsequently identifies the optional field, to return EN-DC radio access capability information, such as through a UE-MRDC-Capability IE.

At times, UEs that implement the newer protocol (e.g., 3GPP TS 36.331 v15.3.0 or later), and comprehend the optional flag 424, return radio access capability information more efficiently relative to UEs that do not comprehend the optional field. For example, in response to receiving a capability enquiry request that includes the optional flag 424, a UE that comprehends the optional field excludes "NR only" band combination and/or a "NR standalone mode" capability information in a UE-NR-Capability IE returned to a requesting device (e.g., base station 121). In other words, a UE that comprehends the optional "eutra-nr-only" field configures the UE-NR-Capability to include only NR capabilities that pertain to EN-DC only as specified in TS38.331 [82]. For example, the UE may support at least one "NR only" band combination for "NR only" carrier aggregation and/or dual connectivity (CA/DC). However, in response to comprehending the optional flag 424, the UE generates a UE-NR-Capability IE that does not include all of the at least one "NR only" band combination or part of the at least one "NR only" band combination in the UE-NR-Capability IE. Thus, a UE that supports the newer protocol, and comprehends the optional field, reduces a number of bits returned in the UE Capability Information message.

Conversely, a UE that does not comprehend the optional field includes the "NR only" band combination information in the UE-NR-Capability IE, thus increasing the size, and amount of information, included in the UE-NR-Capability IE relative to the UE-NR-Capability IE that excludes the "NR only" band combination(s). However, the UE may include EN-DC radio access capability information (e.g., MRDC capabilities) within the UE-NR-Capability IE, thus providing a mechanism for UE's not implementing newer protocols to return dual connectivity capabilities.

To demonstrate, consider now FIG. 5 that illustrates an example information element 500 (IE 500) that can be used for transmitting UE capability information in accordance with one or more implementations. The IE 500 corresponds to an example UE-NR-Capability IE, such as a UE-NR-Capability IE included in a UECapabilityInformation transmitted by the user equipment. In various implementations, the UE 110 generates the IE 500 using processor 210 of FIG. 2, stores the IE 500 in CRM 212 of FIG. 2, and/or communicates the IE 500 to the base station 121 over the wireless links 131 of FIG. 1.

At times, the UE returns a UE-CapabilityRAT-Container for each requested and supported RAT with the UECapabilityInformation, where each UE-CapabilityRAT-Container corresponds to a container for radio access capabilities for a particular RAT. To illustrate, in response to receiving a UECapabilityEnquiry message that includes a UE-CapabilityRequest (e.g., field 410) with an entry set to "nr", the UE generates a UE-CapabilityRAT-Container with the RAT type set to "nr" and a UE-NR-Capability IE that corresponds to the UE's radio access capabilities pertaining to New Radio, such as IE 500. In some implementations, the UE configures the UE-NR-Capability IE based on the requestedFreqBandsNR-MRDC received in the UECapabilityEnquiry message, the presence (or lack of presence) of the eutra-nr-only flag, and/or whether the UE recognizes the presence (or lack of presence) of the eutra-nr-only flag (e.g., the UE supports a newer protocol that implements the eutra-nr-only flag). When the UE includes NR capabilities, and the request specifies radio access capabilities for NR, the UE generates and configures a UE-CapabilityRAT-Container with the UE's NR capabilities (e.g., UE-NR-Capability IE). As another example, in response to receiving a UECapabilityEnquiry message that includes a UE-CapabilityRequest with an entry set to "eutra-nr", the UE generates a UE-CapabilityRAT-Container with the RAT type set to "eutra-nr", and additionally includes (supported) UE radio access capabilities for EUTRA-NR within the UE-CapabilityRAT-Container.

The UE-NR-Capability IE 500 includes a featureSetCombination field 502 that corresponds to a list of FeatureSetCombination:s for NR, such as FeatureSetDownlink:s and FeatureSetUplink:s. In implementations, the UE configures the featureSetCombination field 502 to indicate supported NR features and/or UE radio access capabilities for NR, such as supported "NR only" band combinations, "NR standalone mode" capabilities, and so forth. Alternately or additionally, the UE-NR-Capability IE includes a BandCombinationList IE (not illustrated in IE 500), such as through a supportedBandCombinationList field, that the UE configures to indicate supported band combinations for NR.

In implementations, when the UE supports protocol versions that identify the optional (eutra-nr-only-r15) flag 424, and the UE receives a UECapabilityEnquiry message that includes the optional field, the UE excludes one or more supported "NR only" band combination(s) and/or "NR standalone mode" capabilities from the IE 500, such as by excluding the one or more "NR only" band combinations from the BandCombinationList IE and/or the supportedBandCombinationList field. Alternately or additionally, the UE 110 excludes one or more supported "NR only" band combination(s) and/or "NR standalone mode" capabilities from the featureSetCombination field 502.

To illustrate the exclusion of band only combinations and/or standalone mode capabilities, consider a scenario in which the UE supports at least one "NR only" band combination for "NR only" carrier aggregation and/or dual connectivity (CA/DC). In response to identifying the presence of the optional field, the UE excludes the supported "NR only" CA/DC from the IE 500, such as by excluding the "NR only" CA/DC information from the BandCombinationList IE, the supportedBandCombinationList field, and/or the featureSetCombination field. This improves the efficiency of the returned UECapabilityInformation message by reducing an amount of information included in the message.

In some implementations, the UE does not identify the optional flag 424, such as when the UE only supports older protocols and does not support newer protocols (e.g., the UE does not implement 3GPP TS 36.331 v15.3.0 or later). Accordingly, UEs that only support older protocols do not identify an optional (eutra-nr-only-r15) field included in a UECapabilityEnquiry message. In generating the UECapabilityInformation message, and in response to identifying that the UE CapabilityEnquiry message includes a UE-CapabilityRequest (e.g., field 410) with an entry set to "nr", the UE generates a UE-CapabilityRAT-Container with the RAT type set to "nr" and a UE-NR-Capability IE (e.g., IE 500) that corresponds to the UE's radio access capabilities for New Radio. In configuring the UE-NR-Capability IE, the UE includes "NR only" band combination(s) and/or "NR standalone mode" capabilities supported by the UE in the UE-NR-Capability IE. Alternately or additionally, the UE includes EN-DC radio access capability information (e.g., MRDC capabilities) within the UE-NR-Capability IE, thus providing a mechanism for UE's not implementing newer protocols to return dual connectivity capabilities. Thus, UEs that fail to identify the optional (eutra-nr-only-r15) field increase the amount and/or number of bits included in the UE-NR-Capability IE relative to UEs that identify the optional field, but do return dual connectivity information within the UE-NR-Capability IE.

Having described an example of acquiring dual connectivity user equipment capabilities, consider now example signaling and control transaction diagrams that can be used for transmitting user equipment capabilities.

Data and Control Examples

Figure 6:
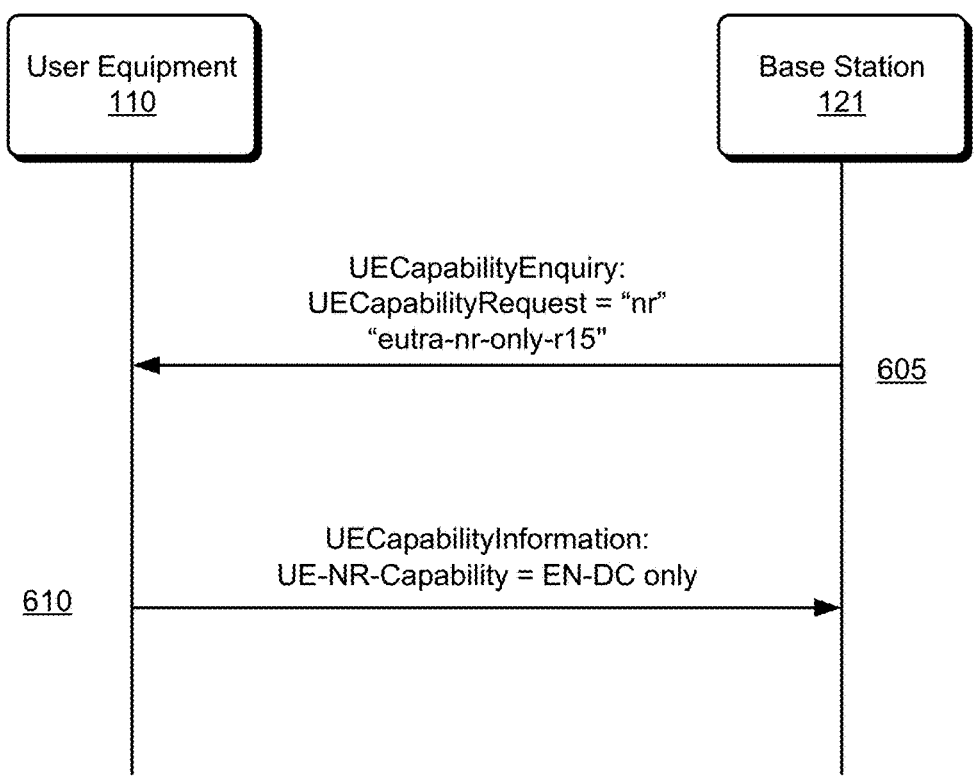
FIG. 6 illustrates an example signaling and control transaction diagram that is in accordance with one or more implementations of transmitting user equipment capabilities.

FIG. 6 illustrates an example signaling and control transaction diagram 600 that is in accordance with one or more implementations of transmitting user equipment capabilities. Here the UE 110 communicates with the base station 121, but the UE can communicate with alternate base stations. In more detail, at 605, the base station 121, transmits a UECapabilityEnquiry message having two fields and/or flags, "nr" and "eutra-nr-only-r15". For example, the base station configures a UE-CapabilityRequest element (e.g., field 410) of the UECapabilityEnquiry message to include "nr", where UEs that support older protocols, such as 3GPP TS 36.311 v15.2.2, identify the UE-CapabilityRequest element. Alternately or additionally, the base station 121 includes an optional (eutra-nr-only-r15) field (e.g., optional flag 424), that newer protocols support, such as 3GPP TS 36.311 v15.3.0 or later. Thus, the UECapabilityEnquiry message includes at least two requested RAT fields, where at least one of the fields is supported by older protocols, as noted elsewhere herein.

At 610, the UE 110 responds with an information element that includes capability information of the UE. In this example, the UE 110 communicates a UECapabilityInformation IE that includes a UE-NR-Capability IE (e.g., IE 500) configured with EN-DC only radio access capability information. In other words, based on a supported protocol, the UE 110 identifies the optional (eutra-nr-only-r15) field.

In response to identifying the optional field, the UE 110 excludes one or more supported "NR only" band combination(s) and/or "NR standalone mode" capabilit(ies) from the UE-NR-Capability IE, such as by excluding the "NR only" band combination from a FeatureSetCombination field, a supportedBandCombinationList field, etc., thus decreasing a size of the UE-NR-Capability IE as further described. This example situation may arise when a base station, such as an EUTRA base station, intends to restrict a size of the UE-NR-Capability IE or a network of the EUTRA base station does not support "NR standalone mode".

Figure 7:
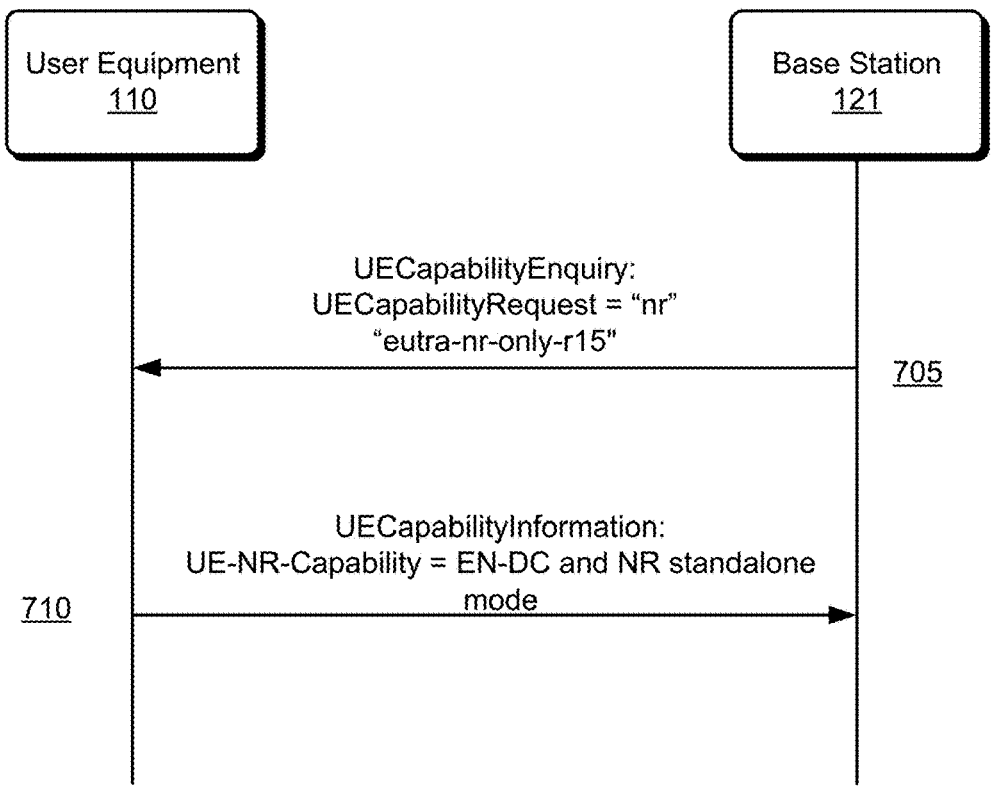
FIG. 7 illustrates an example signaling and control transaction diagram that is in accordance with one or more implementations of transmitting user equipment capabilities.

FIG. 7 illustrates an example signaling and control transaction diagram 700 that is in accordance with one or more implementations of transmitting user equipment capabilities. Here the user equipment 110 communicates with the base station 121, but the UE can communicate with alternate base stations. In more detail, at 705, the base station 121 transmits a UECapabilityEnquiry message having two fields and/or flags, "nr" and "eutra-nr-only-r15". For example, the base station configures a UE-CapabilityRequest field (e.g., field 410) of the UECapabilityEnquiry message to include "nr", where UEs that support older protocols, such as 3GPP TS 36.311 v15.2.2, identify the UE-CapabilityRequest field. Alternately or additionally, the base station 121 includes an optional (eutra-nr-only-r15) field (e.g., optional flag 424), that newer protocols support, such as 3GPP TS 36.311 v15.3.0 or later. Thus, the UECapabilityEnquiry message includes at least two requested RAT fields, where at least one of the fields is supported by older protocols, as noted elsewhere herein.

At 710, the UE 110 responds with an information element (IE) that includes radio access capability information of the UE. For instance, the UE 110 communicates a UECapabilityInformation IE that includes a UE-NR-Capability IE (e.g., IE 500). In this example, the UE 110 implements an older protocol that does not identify the optional (eutra-nr-only-r15) field but does identify the UE-CapabilityRequest field with an "nr" entry. Accordingly, the UE configures the UE-NR-Capability IE with both "NR standalone mode" capabilities (and/or "NR only" user equipment capabilities) and EN-DC radio access capability information. In this manner, the response from the UE indicates supported radio access capabilities for NR, including "NR standalone mode" capabilit(ies) and/or "NR only" band combination(s), as well as supported EN-DC radio access capabilit(ies). The UE may include a part or all of the at least one "NR only" band combinations supported by the UE in a BandCombinationList IE within the UE-NR-Capability IE as further described.

Having described example signaling and control transaction diagrams that can be used for transmitting user equipment capabilities, consider now some example methods that are in accordance with one or more implementations.

Example Methods

Example methods 800, 900, 1000, 1100, and 1200 are described with reference to FIGS. 8, 9, 10, 11, and 12 in accordance with one or more aspects of transmitting user equipment capabilities. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 8:
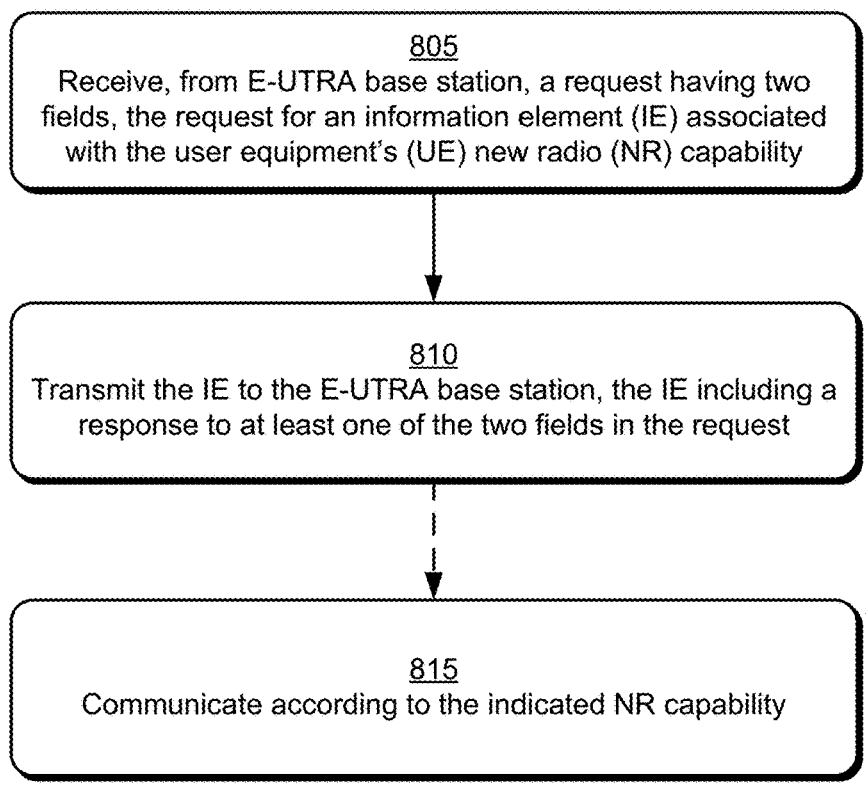
FIG. 8 illustrates an example method of transmitting user equipment capabilities as generally related to operations performed by a user equipment.

FIG. 8 illustrates an example method(s) 800 of transmitting user equipment capabilities as generally related to a base station, such as base station 121. At 805, a UE receives, from an Evolved Universal Terrestrial Radio Access (E-UTRA) base station, a request for an information element. For example, the UE (e.g., the UE 110) receives a UECapabilityEnquiry message (e.g., at 605, at 705) from a base station (e.g., base station 121), where the UECapabilityEnquiry message requests radio access capabilities.

In implementations, the request includes at least one field supported by older protocols (e.g., 3GPP TS 36.311 v15.2) for requesting radio access capabilities, and at least one field supported by newer protocols (e.g., 3GPP TS 36.311 v15.3.0 or later) for requesting radio access capabilities. To illustrate, the request includes a UECapabilitiesRequest field (e.g., field 410) and an optional field (e.g., flag 424). Accordingly, at times, the request for RAT user equipment capabilities includes fields supported by different versions of protocol. In some implementations, the UE receives the request for the information element in a single communication, where the single communication includes the fields supported by different versions of protocol.

The multiple fields provide a first mechanism to request EN-DC user equipment capabilities from UEs that support older protocols (e.g., UE-CapabilityRequest 406, field 410), and a second mechanism to request EN-DC user equipment capabilities from UEs that support newer protocols (e.g., optional flag 424). By using the first mechanism supported by older protocols, in conjunction with the second mechanism supported by newer protocols, the request includes at least one field comprehendible to UEs implementing older protocols. In turn, a UE supporting the older protocol responds to the first mechanism (e.g., field 410) and not the other (e.g., flag 424), and the requesting device (e.g., base station 121) receives the requested capability information used to support dual connectivity. For example, the UE 110 configures a UE-NR-Capability IE to include a combination of "NR standalone mode" UE capabilities, "NR only" band combinations, and/or EN-DC UE capabilities.

UEs supporting newer protocols comprehend the second mechanism (e.g., flag 424), and response accordingly. For example, UE 110 configures a UE-NR-Capability IE to include EN-DC only user equipment capabilities and excludes one or more supported "NR only" band combinations and/or "NR standalone mode" capabilities based on identifying the second mechanism.

At 810, the UE transmits the information element (e.g., at 610, at 710) to the E-UTRA base station. For instance, the UE (e.g., UE 110) generates and configures a UECapabilityInformation IE that includes a UE-NR-Capability IE (e.g., IE 500), and transmits the UECapabilityInformation IE to the base station (e.g., base station 121). As further described, the transmitted information element corresponds to an information element configured by the UE based on a combination of supported user equipment capabilities and at least one of the two fields and/or flags the UE comprehends.

As one example, in scenarios in which the UE supports older protocols, the information element includes a UE-NR-Capabilities configured based on the UE identifying the first mechanism (e.g., field 410) and failing to identify the second mechanism (e.g., flag 424). As another example, in scenarios in which the UE supports newer protocols, the information element includes a UE-NR-Capabilities configured based on the UE identifying the second mechanism (e.g., flag 424). In either example, transmission of the information element includes the configured UE-NR-Capability IE and enables dual connectivity of the UE 110 with the EUTRA base station and the 5G NR base station 122 according to the UE 110's NR capability.

Optionally, at 815, the UE communicates with a 5G NR base station communicate according to the indicated NR capability while connected to the E-UTRA base station. For example, the UE (e.g., UE 110) communicates with a 5G NR base station (e.g., base station 122) while connected to the E-UTRA base station (e.g., base station 121).

Figure 9:
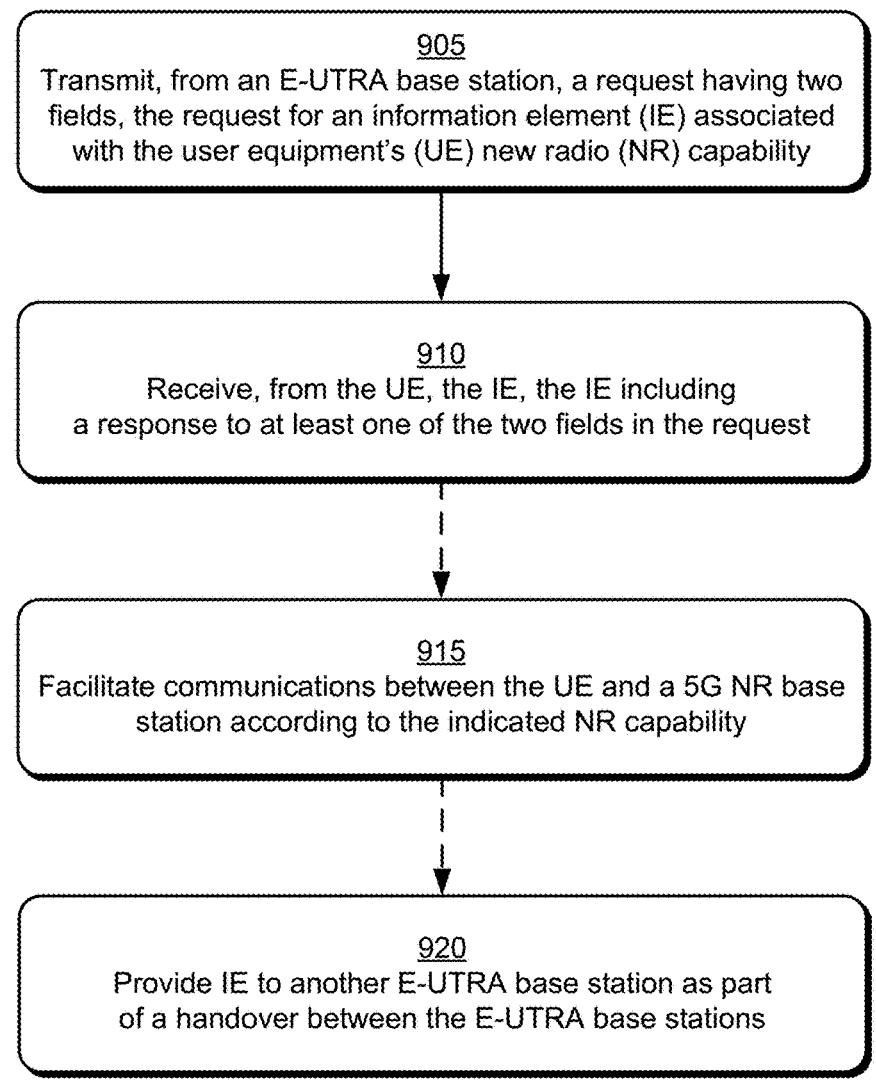
FIG. 9 illustrates an example method of transmitting user equipment capabilities as generally related to operations performed by a base station.

FIG. 9 illustrates example method(s) 900 of transmitting user equipment capabilities as generally related to a base station requesting an IE from a UE. In implementations, the method 900 can be implemented by a base station, such as an EUTRA base station (e.g., base station 121)

At 905, a base station transmits, to a user equipment (UE), a request for an information element. For example, the base station (e.g., base station 121) transmits a UECapabilityEnquiry message (e.g., at 605, at 705) to the UE (e.g., UE 110) that includes a UECapabilityEnquiry message (e.g., message 400). In implementations, the base station configures the request to include at least two fields and/or flags associated with requesting a New Radio (NR) capability IE from the UE, where a first field of the request corresponds to an older protocol (e.g., 3GPP TS 36.311 v15.2) and a second field of the request corresponds to a newer protocol (e.g., 3GPP TS 36.311 v15.3.0 or newer protocol). For instance, the request can include a UECapabilityRequest field (e.g., field 410) that UEs implementing the older protocol comprehend, and an optional (eutra-nr-only-r15) field (e.g., flag 424) that UE's implementing the newer protocol comprehend. Similar to that described with reference to the method 800, in scenarios in which the UE 110 supports older protocols, the UE comprehends the first field in the transmitted request but not the second field, and determines to respond to the first field. Alternately or additionally, in scenarios in which the UE 110 supports newer protocols, the UE comprehends the second field in the transmitted request and determines to respond to the second field.

At 910, the E-UTRA base station receives, from the UE, the information element (IE). For example, the base station (e.g., base station 121) receives a UECapabilityInformation message (e.g., at 610, at 710) from the UE (e.g., UE 110), where the UECapabilityInformation message includes a UE-NR-Capability IE (e.g., IE 500). In implementations, the UE-NR-Capability IE includes a combination of radio access capabilities supported by the UE, where the combination is based on at least one of the two fields and/or flags. To illustrate, the UE-NR-Capability IE includes, in some scenarios, a combination of supported "NR standalone mode" capabilities, "NR only" band combinations, and/or EN-DC UE capabilities. In other scenarios, the UE-NR-Capability IE includes EN-DC only radio access capabilities and/or excludes one or more supported "NR only" band combinations and/or "NR standalone mode" capabilities.

Optionally at 915, the base station facilitates communications between the UE and a 5G NR base station according to the indicated NR capability. For example, the base station (e.g., 121) initiates communications between the UE (e.g., UE 110) and a 5G NR base station (e.g., base station 122) based on the response received at 910.

To illustrate, in scenarios in which the E-UTRA base station is a master node (e.g., a master eNB or a master ng-eNB), the base station (e.g., base station 121) provides the UE's NR capability information to a 5G NR base station (e.g., base station 122) in a secondary node (SN) Addition Request message (e.g., a SgNB Addition Request message or a S-NG-RAN node Addition Request message) to direct the 5G NR base station to configure EN-DC or NGEN-DC for the UE. In response to receiving the UE's NR capability information, the 5G NR base station generates one or more 5G NR configuration(s) according to the UE's NR capability. That is, the 5G NR base station does not configure the 5G NR configuration(s) over and/or outside of the UE's NR capability.

In implementations, the 5G NR base station includes the 5G NR configuration(s) (e.g., in the form of 5G NR RRC IE(s) or a 5G NR RRC message, such as an RRC Reconfiguration message) in a SN Addition Request Acknowledge message (e.g., a SgNB Addition Request Acknowledge message or a S-Node Addition Request Acknowledge message). The 5G NR base station then sends the SN Addition Acknowledge message in response to the SN Addition Request message.

Afterwards, the EUTRA base station transmits an E-UTRA RRC message that includes the 5G NR configuration(s) to the UE. The UE then transmits an E-UTRA RRC response message to the E-UTRA base station in response to the E-UTRA RRC message. Thus, the UE and the 5G NR base station communicate according to the indicated NR capability while the UE is connected to the E-UTRA base station, e.g., the UE is EN-DC or NG-ENDC with the E-UTRA base station and the 5G NR base station. As noted, the response is effective to enable the UE and the 5G NR base station to communicate according to the UE's NR capability.

Optionally, at 920, the E-UTRA base station provides the IE received at 910 to another base station as part of a handover of the UE to the other base station (e.g., base station 123). For example, the base station (e.g., base station 121) provides the received IE (e.g., IE 500) to another base station (e.g., the base station 123 of FIG. 1 via the link 104 or via the link 118) as part of performing a handover of the UE to the base station. In implementations, the UE radio access capabilities received in the IE at 910 enable the 5G NR base station to determine one or more 5G NR configuration(s) according to the UE's NR capability when the other base station (e.g., base station 123) configures the 5G NR base station as a SN (e.g., Secondary gNB (SgNB)) for the UE. The other base station (e.g., base station 123) may be an E-UTRA base station or a 5G NR base station.

The following are examples in accordance with the method 800 and/or method 900 described above. In one example, at 810, the UE (e.g., UE 110) includes a new field in the UECapabilityInformation IE that indicates which of the two fields and/or flags in the request (e.g., field 410, optional flag 424) was used by the UE to configure information included (and/or excluded) in the UE-NR-Capability IE. In more detail, the new field can indicate that the UE based the information included (and/or excluded) in the UE-NR-Capability IE on the newer-protocol field (e.g., optional flag 424), and therefore, the UE-NR-Capability IE excludes UE-supported radio access capability information. Responsive to identifying the new field included by the UE, the other base station (e.g., the base station 123) may request, from the UE (e.g., UE 110), additional NR capability, such as by requesting a second UE Capabilities IE. If the UE does not include the new field, the other base station (e.g., base station 123) may not request that the UE (e.g., UE 110) send additional NR UE capability information.

In another example, the E-UTRA base station (e.g., base station 121) indicates, in a Handover Request message to the other base station (e.g., base station 123), that the UE (e.g., UE 110) responded to the newer-protocol field in configuring the information included (and/or excluded) in the IE received at 910. Responsive to the indication, the other base station (e.g., the base station 123) may request, from the UE, additional NR capability, such as by requesting a second UE Capability IE. If the E-UTRA base station (e.g., base station 121) does not include the indication, the other base station (e.g., base station 123) may not request the additional NR capability from the UE (e.g., UE 110).

Figure 10:
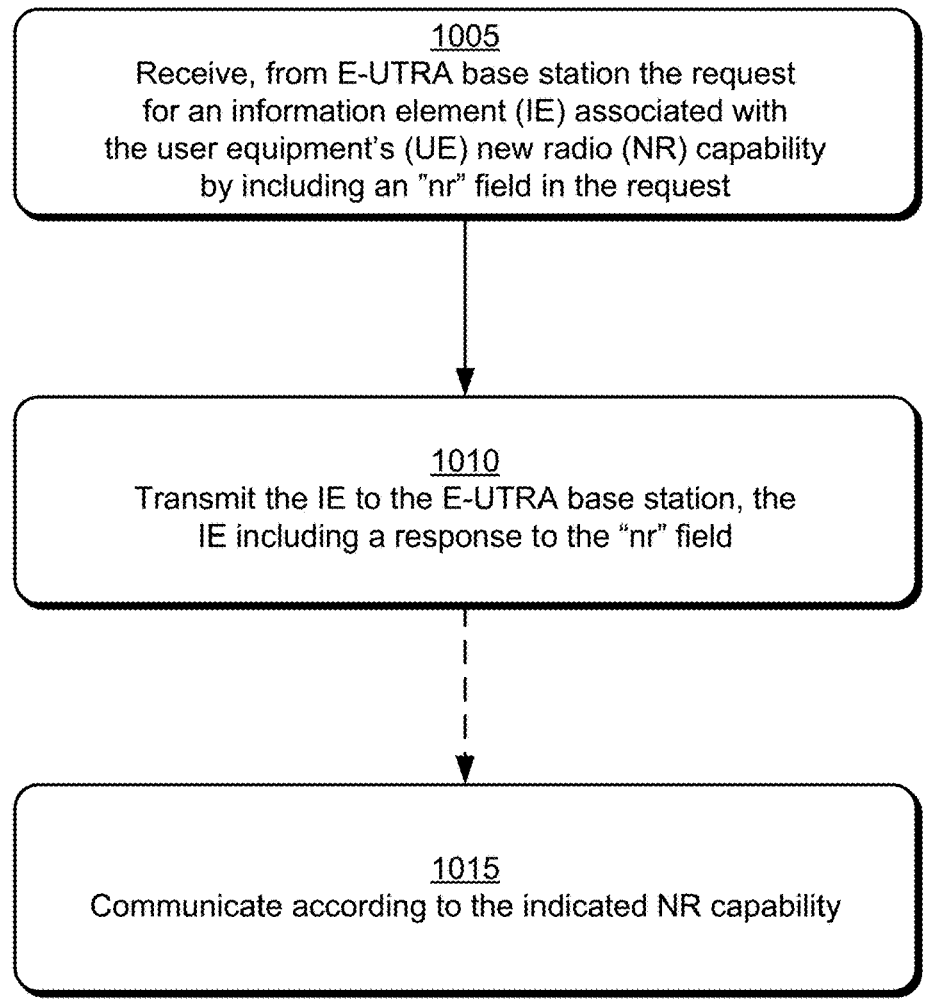
FIG. 10 illustrates an example method of transmitting user equipment capabilities as generally related to operations performed by a user equipment.

FIG. 10 illustrates example method(s) 1000 of transmitting user equipment capabilities as generally related to communications with a base station, such as base station 121. In some scenarios, a UE (e.g., UE 110) implements the method 1000.

At 1005, a UE receives, from an Evolved Universal Terrestrial Radio Access (E-UTRA) base station, (e.g., the base station 121) the request for an information element associated with the UE's new radio capability by including an "nr" field in the request. For example, the UE (e.g., UE 110) receives a request from a base station (e.g., base station 121) for radio access capabilities information, where the request includes a request for NR capabilities through the inclusion of "nr" in a UECapabilityRequest field (e.g., field 410). In one example, the UE may be configured to support EN-DC but configured to not support "NR standalone mode" even though the UE's hardware supports the "NR standalone mode". In another example, the UE does not support the "NR standalone mode" due to limitation of the UE's hardware or software.

At 1010, the UE transmits the information element to the E-UTRA base station in response to the "nr" field. For example, the UE (e.g., UE 110) configures a UE-NR-Capability IE (e.g., IE 500) based on identifying the "nr" field in the request received at 1005. In examples in which the UE supports EN-DC but not "NR standalone mode", the UE configures the UE-NR-Capability IE to reflect the supported capabilities (e.g., include EN-DC UE capabilities, exclude (unsupported) "NR standalone mode" UE capabilities).

Optionally, at 1015, the UE and the 5G NR base station communicate according to the indicated NR capability while the UE is connected to the E-UTRA base station. For example, the UE (e.g., UE 110) communicates with a 5G NR base station (e.g., base station 122) based on the UE-NR-Capability IE configured and transmitted at 1010.

To illustrate, consider a scenario in which the E-UTRA base station (e.g., base station 121) corresponds to as a master node (e.g., a master eNB or a master ng-eNB). In implementations, the (master node) base station provides the UE's NR capability to a 5G NR base station (e.g., base station 122) in a secondary node (SN) Addition Request message (e.g., a SgNB Addition Request message or a S-NG-RAN node Addition Request message). At times, in sending UE's NR capability to the 5G NR base station, the E-UTRA base station directs the 5G NR base station to configure EN-DC or NGEN-DC for the UE. In response, the 5G NR base station generates one or more 5G NR configuration(s) according to the UE's NR capability. That is, the 5G NR base station does not configure the 5G NR configuration(s) over and/or outside of the UE's NR capability.

The 5G NR base station includes the 5G NR configuration(s), such as in the form of 5G NR RRC IE(s) or a 5G NR RRC message (e.g., RRC Reconfiguration message), in a SN Addition Request Acknowledge message (e.g., a SgNB Addition Request Acknowledge message or a S-Node Addition Request Acknowledge message). The 5G NR base station then sends, to the base station, the SN Addition Acknowledge message in response to the SN Addition Request message.

In response to receiving the SN Additional Acknowledge message, the EUTRA base station transmits an E-UTRA RRC message including the 5G NR configuration(s) to the UE. The UE then transmits an E-UTRA RRC response message to the E-UTRA base station as a response to the E-UTRA RRC message. Thus, the UE and the 5G NR base station communicate according to the 5G NR configuration(s) while the UE is connected to the E-UTRA base station. For example, the UE is EN-DC or NG-ENDC with the E-UTRA base station and the 5G NR base station. In implementations, transmission of the NR capability (e.g., a UE-NR-Capability IE) enables a UE (e.g., UE 110) and a 5G NR base station (e.g., base station 122) to communicate according to the UE NR capability while the UE is connected with an EUTRA base station (e.g., base station 121).

Figure 11:
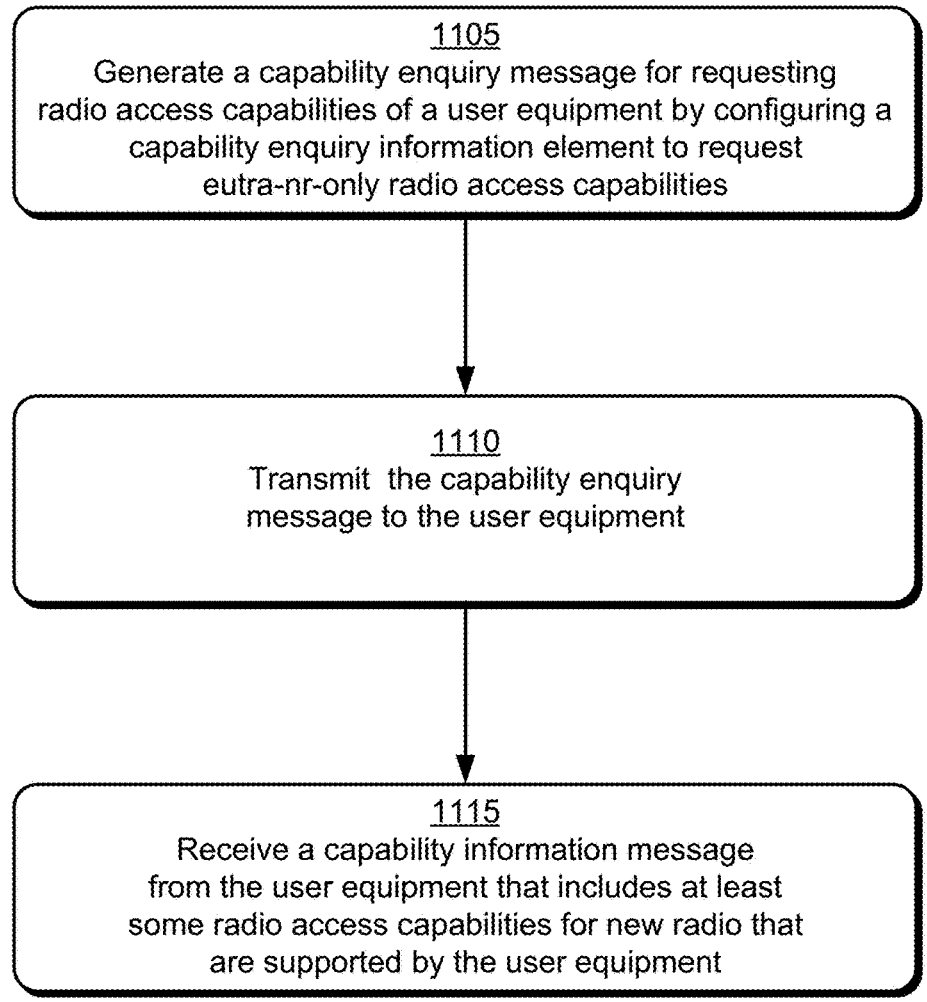
FIG. 11 illustrates an example method of transmitting user equipment capabilities as generally related to operations performed by a base station.

FIG. 11 illustrates example method 1100 of transmitting user equipment capabilities as generally related to a base station, such as base station 121, determining NR capabilities for the user equipment 110.

At 1105, a base station generates a capability enquiry message for requesting the radio access capabilities of the user equipment by configuring a capability enquiry information element in the capability enquiry message to request eutra-nr-only radio access capabilities of the user equipment. For example, an EUTRA base station (e.g., base station 121) generates a request for UE capabilities by including an optional flag (e.g., flag 424) in a capability enquiry message (e.g., message 400). Alternately or additionally, the capability enquiry message includes a capability request field (e.g., field 410) that includes one or more entries, such as "nr", "eutra", "eutra nr", etc., to request radio access capabilities for particular RATs.

In some implementations, a first protocol, such as 3GPP TS 36.331 v15.2.2 implements and/or supports the capability request field (e.g., field 410) such that UEs implementing the first protocol identify the capability request field. Alternately or additionally, a second protocol, such as 3GPP TS 36.331 v15.3.0 or later, implements the optional flag (e.g., flag 425) such that UEs implementing the second protocol identify the presence (or lack of presence) of the optional flag. Accordingly, in implementations, the base station generates the capability enquiry message, by way of the capability enquiry information element, to request radio access capabilities using different request mechanisms to communicate the request for radio access capabilities to UEs supporting different protocol versions.

In some implementations, the capability enquiry message includes one or more requested frequency bands for multi-radio access technology dual connectivity. For example, a UECapabilityEnquiry message (e.g., message 400) includes a requestedFreqBandsNR-MRDC-r15 field (e.g., field 418), and the base station (e.g., base station 121) configures the field as a list of NR and/or EUTRA frequency bands. The list indicates, to a receiving UE, a request for supported NR Carrier Aggregation and/or MR-DC band combinations. In other words, the base station configures the field as a list of requested frequency bands.

At 1110, the base station transmits the capability enquiry message to the user equipment. To illustrate, the EUTRA base station (e.g., base station 121) transmits the request for radio access capabilities to the UE (e.g., UE 110), such as that described at 605 of FIG. 6 and/or 705 of FIG. 7.

At 1115, the base station receives a capability information message from the user equipment that includes at least some radio access capabilities for new radio that are supported by the user equipment, such as that described at 610 of FIG. 6 and/or 710 of FIG. 7. The EUTRA base station (e.g., base station 121), for example, receives a UECapabilityInformation message that includes a UE-CapabilityRAT-Container for each requested, and supported, RAT, where a UE-CapabilityRAT-Container corresponds to a container that includes UE capabilities for a particular RAT, such as a UE-NR-Capability IE, a UE-MRDC-Capability IE, etc. As one example, in response to including "nr" in the capability request field (e.g., field 410), the base station receives a UE-NR-Capability IE. Alternately or additionally, in response to including "eutra-nr" in the capability request field (e.g., field 410), the base station receives a UE-MRDC-Capability IE. In some implementations, the configuration of the information included in the UE-NR-Capability IE is based, at least in part, on the optional flag (e.g., flag 424) in the capability enquiry information element.

To illustrate, in response to a UE failing to identify the optional flag (e.g., flag 424) in the request, some implementations of the received UE-NR-Capability IE include one more band combinations supported by the UE and/or one or more feature sets supported by the UE for new radio. In other implementations, in response to a UE identifying the second field, the received UE-NR-Capability IE does not include "nr only" band combinations and/or "nr standalone mode" capabilities as described. In some implementations, the included one or more band combinations are based, at least in part, on the requestedFreqBandsNR-MRDC-r15 field in the request.

Figure 12:
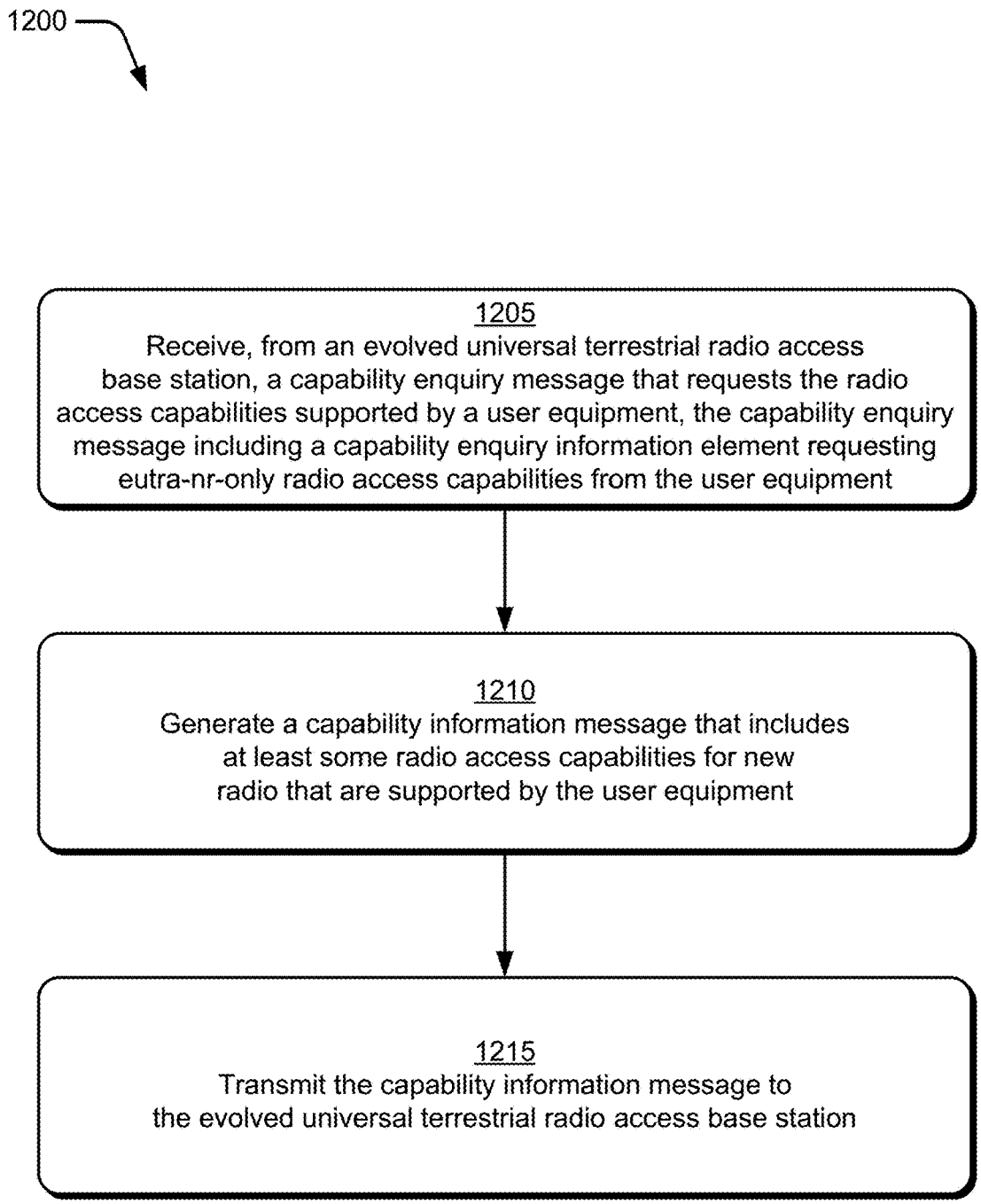
FIG. 12 illustrates an example method of user equipment capabilities as generally related to operations performed by a user equipment.

FIG. 12 illustrates an example method 1200 of transmitting user equipment capabilities as generally related to communications with a base station, such as base station 121. In some scenarios, a UE (e.g., UE 110) implements the method 1200.

At 1205, a user equipment receives, from an evolved universal terrestrial radio access base station, a capability enquiry message that requests the radio access capabilities supported by the user equipment, where the capability enquiry message includes a capability enquiry information element that requests eutra-nr-only radio access capabilities from the user equipment. As one example, the UE (e.g., UE 110) receives a UECapabilityEnquiry message (e.g., message 400) from the base station (e.g., base station 121), where the UECapabilityEnquiry message includes an optional flag (e.g., flag 424) that requests eutra-nr-only radio access capabilities. Alternately or additionally, the capability enquiry information element includes a capability request field (e.g., field 410) that includes one or more entries, such as "nr", "eutra", "eutra nr", etc., to request radio access capabilities for particular RATs.

At 1210, the user equipment a capability information message that includes at least some radio access capabilities for new radio that are supported by the user equipment. For example, in implementations, the UE (e.g., UE 110) generates a user equipment new radio capabilities information element (e.g., IE 500), and configures the user equipment new radio capabilities information element, to include the radio access capabilities corresponding to new radio supported by the UE. In some implementations, the UE configures the user equipment new radio capabilities information element to include one or more band combinations supported by the user equipment and one or more feature sets supported by the user equipment. Sometimes, when a request for the user equipment capabilities includes one or more requested frequency bands for multi-radio access technology dual connectivity, the UE includes band combination(s) in the user equipment new radio capabilities IE based, at least in part, on the requested frequency band(s) in the request.

At times, the UE (e.g., UE 110) determines to exclude the band combination(s) from the user equipment new radio capabilities IE. For instance, in implementations where the capability enquiry message includes an optional flag (e.g., flag 424) that requests eutra-nr-only radio access capabilities, and the UE identifies the presence of the optional flag, the UE determines to exclude the band combination(s) from the user equipment new radio capabilities IE. In other implementations, the UE determines to exclude the band combination(s) based on the capability request field of the first field including an evolved universal terrestrial radio access entry that requests radio access capabilities corresponding to evolved universal terrestrial radio access.

In some implementations, the UE generates and includes a UE-NR-Capability IE in the capability information message, such as in response to identifying the optional flag (e.g., optional flag 424) and/or in response identifying a capability request field (e.g., field 410) that includes an "nr" entry. Alternately or additionally, the UE generates and includes a UE-MRDC-Capability IE in the capability information, such as in response to identifying the optional flag (e.g., optional flag 424) and/or in response identifying the capability request field (e.g., field 410) includes an "eutra nr" entry. As further described, the configuration of the information included in the UE-NR-Capability IE is based, at least in part, on the optional flag (e.g., flag 424) in the capability enquiry information element.

At 1215, the user equipment transmits capability information message to the evolved universal terrestrial radio access base station. For instance, the UE (e.g., UE 110) transmits a UECapabilityInformation message to the base station (e.g., base station 121), such as that described at 610 of FIG. 6 and/or 710 of FIG. 7, where the UECapabilityInformation message, at times, includes a UE-NR-Capability IE (e.g., IE 500) configured based on the optional flag (e.g., 424) and/or a capability request field (e.g., 410).

Although aspects of transmitting user equipment capabilities have been described in language specific to features and/or methods, the subject of the appended claims is not necessarily limited to the specific features or methods described. Rather, the specific features and methods are disclosed as example implementations of transmitting user equipment capabilities, and other equivalent features and methods are intended to be within the scope of the appended claims. Further, various different aspects are described, and it is to be appreciated that each described aspect can be implemented independently or in connection with one or more other described aspects.

What is claimed is:

1. A method for communicating radio access capabilities supported by a user equipment, the method comprising:

receiving, by the user equipment and from a base station, a capability enquiry message that requests the radio access capabilities supported by the user equipment, the capability enquiry message including at least a first field that requests eutra-nr-only radio access capabilities from the user equipment and a second field that requests nr radio access capabilities from the user equipment;

generating, in response to the user equipment supporting New Radio and receiving the capability enquiry message, a capability information message that includes at least some radio access capabilities for New Radio that are supported by the user equipment; and transmitting the capability information message to the base station.

2. The method as recited in claim 1, wherein the generating the capability information message comprises:

in response to identifying the first field that requests eutra-nr-only radio access capabilities or identifying the second field that request nr radio access capabilities, including a user equipment-new radio-capabilities information element in the capability information message.

3. The method as recited in claim 2, further comprising:

in response to identifying the first field, including at least one multi-radio access technology band combination in the user equipment-new radio-capabilities information element and excluding at least one supported new radio-only band combination from the user equipment-new radio-capabilities information element.

4. The method as recited in claim 3, wherein including the at least one multi-radio access technology band combination in the user equipment-new radio-capabilities information element further comprises:

including evolved universal terrestrial radio access-new radio dual connectivity (EN-DC) capability information in the user equipment-new radio-capabilities information element.

5. The method as recited in claim 4, further comprising:

identifying that the capability enquiry message includes a field that requests radio access capabilities for evolved universal terrestrial radio access; and excluding at least one New Radio band combination, supported by the user equipment, from the capability information message based on the identifying that the capability enquiry message includes the field that requests the radio access capabilities for evolved universal terrestrial radio access.

6. The method as recited in claim 2, further comprising:

in response to not identifying the first field, including one or more new radio-only band combinations supported by the user equipment and one or more multi-radio access technology band combinations in the user equipment-new radio-capabilities information element.

7. A method for requesting, by a base station, radio access capabilities of a user equipment, the method comprising:

generating a capability enquiry message for requesting the radio access capabilities of the user equipment by configuring a capability enquiry information element in the capability enquiry message with at least a first field that requests eutra-nr-only radio access capabilities and a second field that requests nr radio access capabilities of the user equipment;

transmitting, from the base station and to the user equipment, the capability enquiry message; and receiving, by the base station, a capability information message from the user equipment that includes at least some radio access capabilities for New Radio that are supported by the user equipment.

8. The method as recited in claim 7, wherein the receiving the capability information message from the user equipment comprises:

receiving a user equipment-new radio-capabilities information element in the capability information message that includes the at least some radio access capabilities for New Radio.

9. The method as recited in claim 8, wherein the user equipment-new radio-capabilities information element excludes new radio-only band combinations and includes at least one multi-radio access technology band combination.

10. The method as recited in claim 9, wherein the at least one multi-radio access technology band combination in the user equipment-new radio-capabilities information element comprises evolved universal terrestrial radio access-new radio (EN-DC) capability information.

11. The method as recited in claim 8, wherein the user equipment-new radio-capabilities information element includes at one or more new radio-only band combinations and includes at least one multi-radio access technology band combination.

12. The method as recited in claim 8, wherein receiving the user equipment-new radio-capabilities information element comprises:

receiving, in the user equipment-new radio-capabilities information element, one or more band combinations supported by the user equipment and one or more feature sets supported by the user equipment.

13. The method as recited in claim 7, further comprising:

directing, based on the radio access capabilities indicated in the capability information message from the user equipment, a fifth-generation New Radio base station to establish dual connectivity with the user equipment while the base station maintains connectivity to the user equipment.

14. A user equipment apparatus for communicating radio access capabilities, the user equipment apparatus comprising:

a wireless transceiver;

a processor; and computer-readable storage media comprising instructions that direct the user equipment apparatus to perform operations comprising:

receiving, from a base station and using the wireless transceiver, a capability enquiry message that requests the radio access capabilities for New Radio supported by the user equipment apparatus, the capability enquiry message including at least a first field that requests eutra-nr-only radio access capabilities and a second field that requests nr radio access capabilities from the user equipment apparatus;

generating, using the processor, a capability information message that includes at least some radio access capabilities for New Radio that are supported by the user equipment apparatus based at least in part, on receiving the capability enquiry message; and transmitting, using the wireless transceiver, the capability information message to the base station.

15. The user equipment apparatus as recited in claim 14, wherein the generating the capability information message comprises:

in response to identifying the first field that requests eutra-nr-only radio access capabilities or identifying the second field that request nr radio access capabilities, including a user equipment-new radio-capabilities information element in the capability information message.

16. The user equipment apparatus as recited in claim 15, further comprising:

in response to identifying the first field, including at least one multi-radio access technology band combination supported by the user equipment apparatus in the user equipment-new radio-capabilities information element and excluding at least one supported New Radio-only band combination from the user equipment-new radio-capabilities information element.

17. The user equipment apparatus as recited in claim 16, wherein including the at least one multi-radio access technology band combination in the user equipment-new radio-capabilities information element further comprises:

including evolved universal terrestrial radio access-new radio dual connectivity, EN-DC, capability information in the user equipment-new radio-capabilities information element.

18. The user equipment apparatus as recited in claim 15, wherein generating the capability information element further comprises:

in response to not identifying the first field, including one or more New Radio-only band combinations supported by the user equipment and one or more multi-radio access technology band combinations in the user equipment-new radio-capabilities information element.

19. The user equipment apparatus as recited in claim 14, wherein the computer-readable storage media comprises further instructions that direct the user equipment apparatus to perform operations comprising:

identifying that the capability enquiry message requests radio access capabilities for evolved universal terrestrial radio access; and excluding at least one New Radio band combination, supported by the user equipment from the capability information message based on identifying that the capability enquiry message includes the filed that requests the radio access capabilities for evolved universal terrestrial radio access.

\* \* \* \* \*

UNITED STATES PATENT AND TRADEMARK OFFICE
CERTIFICATE OF CORRECTION

PATENT NO. : 11,219,014 B2  
APPLICATION NO. : 16/569061  
DATED : January 4, 2022  
INVENTOR(S) : Chih-Hsiang Wu Page 1 of 1

It is certified that error appears in the above-identified patent and that said Letters Patent is hereby corrected as shown below:

In the Claims

Column 21, Line 17, Claim 2: after "that" before "nr" delete "request" insert --requests--

Column 22, Line 64, Claim 15: after "that" before "nr" delete "request" insert --requests--

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*